United States Patent [19]

Kollmeier et al.

[11] Patent Number: 5,064,870

[45] Date of Patent: Nov. 12, 1991

[54] METHOD FOR THE PRODUCTION OF HIGHLY ELASTIC, COLD-CURING POLYURETHANE FOAMS

[75] Inventors: Hans-Joachim Kollmeier; Georg Burkhart, both of Essen; Rolf-Dieter Langenhagen, Hattinggen-Niederwenigern; Helmut Lammerting, Herbede; Bernd-Jürgen Klietsch, Gelsenkirchen-Buer, all of Fed. Rep. of Germany

[73] Assignee: Th. Goldschmidt AG, Essen, Fed. Rep. of Germany

[21] Appl. No.: 595,677

[22] Filed: Oct. 10, 1990

Related U.S. Application Data

[63] Continuation of Ser. No. 196,137, May 19, 1988, abandoned, which is a continuation-in-part of Ser. No. 71,012, Jul. 8, 1987, abandoned.

[30] Foreign Application Priority Data

Aug. 2, 1986 [DE] Fed. Rep. of Germany ....... 3626297

[51] Int. Cl.$^5$ .............................................. C08J 9/04
[52] U.S. Cl. .................................... 521/111; 521/110; 521/904
[58] Field of Search ...................... 521/111, 110, 904

[56] References Cited

U.S. PATENT DOCUMENTS

| | | | |
|---|---|---|---|
| 3,952,038 | 4/1976 | Prokai | 556/417 |
| 4,039,490 | 8/1977 | Kanner | 521/110 |
| 4,042,540 | 8/1977 | Lammerting et al. | 521/111 |
| 4,067,828 | 1/1978 | Kanner et al. | 521/111 |
| 4,110,272 | 8/1978 | Kanner et al. | 521/111 |
| 4,299,923 | 11/1981 | Baskent et al. | 521/110 |
| 4,347,330 | 8/1982 | Demou et al. | 521/110 |
| 4,613,630 | 9/1986 | Bauman et al. | 521/111 |
| 4,694,028 | 9/1987 | Saeki et al. | 521/110 |

FOREIGN PATENT DOCUMENTS 0000761 8/1982 European Pat. Off. .

Primary Examiner—John Kight, III.
Assistant Examiner—Dennis R. Daley
Attorney, Agent, or Firm—Toren, McGeady & Associates

[57] ABSTRACT

In a method for the preparation of highly elastic, cold curing polyurethane foams, equilibrated organofunctional polysiloxanes of the average general formula

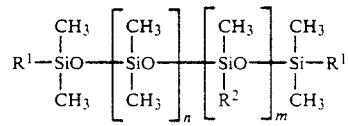

wherein
$R^1$ is methyl or $R^2$,
$R^2$ is chloropropyl,
n has a value of 0 to 12,
m has a value of 1 to 8 when $R^1$ is methyl and a value of 0 to 6 when $R^1$ is chloropropyl,
are added in amounts of 0.01 to 2.0% by weight, based on the polyols, to the reaction batch.

The stabilizing properties of the organofunctional polysiloxanes are superior to those of the known products. The foams, produced pursuant to the invention, have a coarser cell structure and a higher elasticity. The foams are more open-celled as measured by the impression force.

5 Claims, No Drawings

METHOD FOR THE PRODUCTION OF HIGHLY ELASTIC, COLD-CURING POLYURETHANE FOAMS

CROSS REFERENCE TO PRIOR APPLICATIONS

This is a continuation of application Ser. No. 07/196,137, filed May 19, 1988, which was a continuation-in-part of application Ser. No. 07/071,012 filed July 8, 1987, both now abandoned.

FIELD OF THE INVENTION

The invention relates to a method for the production of highly elastic, cold-curing polyurethane foams from at least difunctional polyisocyanates and at least difunctional polyols catalysts, water and/or blowing agents, organofunctional polysiloxanes as stabilizers and optionally other additives.

BACKGROUND INFORMATION AND PRIOR ART

For the production of highly elastic polyurethane cold cured foams, an at least difunctional polyisocyanate, such as toluene diisocyanate or diphenylmethane diisocyanate is reacted with a polyol which has at least two hydroxyl groups per molecule and, on the average, a high proportion of primary hydroxyl groups. Such polyols are usually prepared by first adding propylene oxide to a starter alcohol and then adding ethylene oxide to this addition product in such amounts that at least 40% of the hydroxyl groups, and preferably 70 to 90% of the hydroxyl groups, are present in the form of primary hydroxyl groups.

Due to the high content of primary OH groups, these polyols exhibit a high reactivity towards isocyanates. In contrast to conventional polyurethane foams, the so-called hot cured foams, a high cross-linking density is therefore achieved already during the foaming process This has the advantage that curing takes place without supplying external energy and that the time required for the curing as a whole is reduced. It is, however, a disadvantage that the tendency to form closed-cell foams is increased and that there is less processing leeway. Processing leeway is understood to be the tolerance limits within which it is possible to deviate from a formulation without endangering the formation of stable and, at the same time, open-celled foams.

The reduced leeway which results from the high reactivity of the foaming components and with that the narrow range for forming a stable, but still open-celled foam, does not permit those products to be used as foam stabilizers, which have been used successfully for the production of so-called hot cured foams. Moreover, such stabilizers would lead to foams with an undesirably fine and regular pore structure.

To obtain cold hardening, highly elastic polyurethane foam bodies with satisfactory application-technical characteristics, two principal methods have been developed from a practical point of view, of which there are numerous variations.

Pursuant to the first method, a procedure is used wherein higher functional isocyanates are employed which, on the average, have about 2.2 to 2.6 isocyanate groups. These isocyanates are usually reacted with trifunctional polyols which have a high content of primary hydroxyl groups as well as with low molecular polyfunctional cross-linkers, such as glycerin or triethanolamine. Due to the high reactivity of the raw materials for the foaming, and caused by the use of the low molecular polyfunctional cross-linkers, a chemically stabilized foam body is obtained in principle even without use of foam stabilizers. The foam bodies obtained, however, exhibit an irregular cell structure, wherein the individual cells are essentially closed. This, in turn, means that the foam bodies or materials are not technically usable.

In this first method, it is therefore necessary to add substances to the reaction formulation which render the cell structure uniform, but which do not additionally stabilize the foam from a physical point of view and, thus, cause closing of the cells. This result, pursuant to U. S. Pat. No. 4,042,540, is accomplished by also using organopolysiloxanes of the general formula.

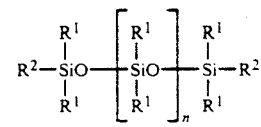

In this formula, $R^1$ stands for hydrocarbon groups with, preferably, 90% of the $R^1$ groups being methyl. Other examples of alkyl groups are, among others, halogen alkyl groups, such as chloromethyl- or 3-chloropropyl groups. The patent also mentions that $R^2$ may be the same as $R^1$. Of particular importance is, however, that the subscript n has a value of from 2 to 10 and that the organopolysiloxane is not permitted to contain units whose value exceeds $n=10$. This, of course, means that the patent is not concerned with equilibrated mixtures with a mole weight distribution which follows statistical laws, such as is common in organosilicon chemistry, but rather the patent is concerned with mixtures from which the units of higher molecular weight are separated by special measures. This, for example, may be accomplished by fractional distillation so that the polysiloxane mixture, subsequent to the separation, exclusively contains siloxanes with 2 to at the most 12 silicone atoms. The preparation of such a polysiloxane cut is cumbersome, requiring considerable expenditure and work, causes loss of substance and, moreover, causes considerable expense, thus increasing the price of the foam bodies.

This first-mentioned basic method has a further disadvantage. This additional disadvantage resides in the fact that the method can only be carried out within very narrow process parameters. In other words, there is very little leeway to vary the method conditions. This in turn means that the desired highly elastic foams with controlled cell structure are only obtained if very narrow formulation limits are maintained. Even then, the physical characteristics of these foam bodies are not satisfactory for a multitude of applications. Due to their high extent of cross-linking, the foam bodies have very low values for elongation at break and tear resistance which render them unsuitable for many applications.

Turning now to the second basic method, this procedure was developed in order to overcome the above-mentioned disadvantages. This method alternative resides in the use of reaction partners which have a lesser cross-linking effect. However, the foam which is formed in this procedure has to be physically stabilized in order to prevent a collapse or relapse of the foam and in order to obtain uniform cell structures.

This second method of operation is carried out, in addition to the reactive polyols, with predominantly difunctional isocyanates, such as pure toluene diisocyanate or mixtures of toluene diisocyanate with crude diphenylmethane diisocyanate in a weight ratio of toluene diisocyanate to diphenylmethane diisocyanate of at least 80% by weight to at the most 20% by weight. In some process variations, the moiety of lower molecular cross-linkers is decreased. In order to improve the hardness of the foam bodies to be obtained, not only polyols composed of propylene oxide and ethylene oxide are used, but also such polyols which additionally contain polymeric components which are chemically bound or physically dispersed into the system. Examples for this are, for example, polymers of acrylonitrile and styrene as well as polymeric urea derivatives. Particularly, the polymeric urea derivatives act on the cell walls in the manner of solid particles and cause the desired cell opening.

As stated, this second method of operation requires stabilization of the foam and, for this purpose, special foam stabilizers are required in order to compensate for the lack of inherent stability of the foams. Two groups of stabilizers are known for this purpose from the state of the art.

One of those groups comprises polysiloxane-polyoxyalkylene-mixed block polymers whose polysiloxane block (or blocks) have an average molecular weight of 150 to 1500 and whose polyoxyalkylene block (or blocks) have an average molecular weight of 150 to 1500. The mixed block polymers are free from hydroxyl groups. Such products and their use are disclosed in, for example, U. S. Pat. No. 3,741,917 and No. 4,031,044.

The second group of stabilizers is formed of polysiloxanes which have at some of the silicon atoms Si-C bound organic groups. Such groups are:

| | |
|---|---|
| Cyanoalkyl | disclosed in U.S. Pat. No. 3,952,038. |
| Cyanoalkoxyalkyl | disclosed in Can. Pat. No. 1,032,551, |
| Sulfolanyloxyalkyl | disclosed in U.S. Pat. No. 4,110,272, |
| Morpholinoalkoxyalkyl | disclosed in U.S. Pat. No. 4,067,828, |
| Tert. Hydroxylalkyl | disclosed in U.S. Pat. No. 4,039,490, |
| Chloromethyl | disclosed in Eur. Pat. No. 0 000 761. |

Siloxanes with such organofunctional groups, however, are not readily accessible and, moreover, are not fully satisfactory in respect to their stabilizing effects. The starting materials required for their synthesis can be obtained, on a technical scale, with great difficulties only and, in some instances, are not available at all.

For example, if one desires to produce chloromethyl group containing polysiloxanes, it is necessary to have access to monofunctional dimethyl chloromethyl chlorosilane (I) and, particularly, difunctional methylchloromethyl dichlorosilane (II):

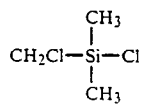

I

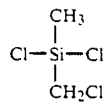

II

The monofunctional silane I can be obtained by photocatalytic halogenation of trimethylchlorosilane. However, the analogous synthesis of the difunctional silane II causes considerable difficulties. Therefore, α,ω-chloromethyl-substituted methylpolysiloxanes are only commercially available. At this point, the present invention sets in. The present invention has, as its primary task, to provide superiorly active stabilizers to use in connection with the above-described second method of operation for the production of cold hardening, highly elastic polyurethane foams, such superiorly acting stabilizers to be readily accessible and resulting in the production of foams or foam bodies with highly satisfying application-technical characteristics.

Surprisingly it has been found that the above requirements are fully met by polysiloxanes having chloropropyl groups linked to the Si atom. Chloropropyl-substituted polysiloxanes are known in the art and are readily available and can be produced in an economic manner. It is possible to produce also such siloxanes in an economic manner in which also the difunctional (chain-forming) siloxy units exhibit chloropropyl groups. In this manner, these modified siloxanes are more readily and in a simpler manner adapted to the conditions which are prescribed or which are the corollary of the formulation and characteristics. In addition, they have improved stabilizing characteristics.

OBJECTS OF THE INVENTION

The primary object of the present invention therefore is to improve on the prior art methods to produce highly elastic, cold-curing polyurethane foams.

SUMMARY OF THE INVENTION

Pursuant to the invention, such foams are prepared in the presence of equilibrated organofunctional polysiloxanes of the average general formula

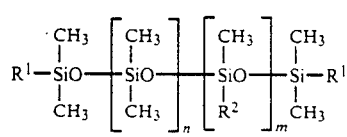

I wherein $R^1$ represents methyl or $R^2$, $R^2$ represents chloropropyl, n has a value of 0 to 12, m has a value of 1 to 8 when $R^1$ is methyl and a value of 0 to 6 when $R^1$ is chloropropyl, in amounts of 0.01 to 2.0 percent by weight based on the polyols.

As equilibrated organofunctional polysiloxanes, those of the average general formula

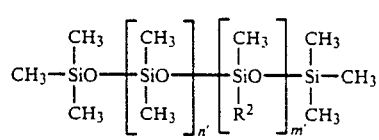

II are preferably used, wherein $R^2$ is chloropropyl, n' has a value of 1 to 10, and m' has a value of 1 to 6.

The term "equilibrated organopolysiloxanes or organofunctional polysiloxanes" as used herein means that the mixture of organopolysiloxanes is in an equilibrium condition which at least approaches the statistical equilibrium distribution. This means, in turn, that the values for the subscripts n and m are based on the average molecule; in other words, they are formed by the arithmetic mean of the sum of the values n and m of the individual molecules.

The polysiloxanes, used for the inventive method, may be used by themselves or together with siloxanes known from the state of the art.

For the inventive method, reaction components and additives may be used which are known and customary for the production of highly elastic polyurethane foams.

As difunctional polyisocyanates, the isomers of toluene diisocyanate, the isomers of diisocyanatodiphenylmethane or oligomeric polyphenylmethylene isocyanates are usable.

The polyols have at least 2 and especially 2 to 8 hydroxyl groups per molecule, of which at least 40% and preferably 70 to 90%, on the average, are primary hydroxyl groups. The molecular weight portion per hydroxyl group (equivalent weight) is 700 to 3,000. The polyols may consist exclusively of oxyethylene and oxypropylene entities. Up to 30% by weight of other polymeric substituents may be chemically bound in or physically dispersed in the polyols. Such other polymeric components are, for example, polymers of styrene or acrylonitrile or copolymers thereof as well as, for example, polymeric organic urea derivatives.

As catalysts, the usual catalysts, such as organic salts of tin and tertiary amines, are used.

Suitable blowing agents are water as well as fluorochloro hydrocarbons, which are known in general for this purpose. Further additives are flame retardants, such as chloroalkylphosphate estrs as well as inert fillers and pigments.

The organofunctional polysiloxanes to be used in the method of the invention may be synthesized by the generally known method of cohydrolysis and condensation of the mono- and difunctional chlorosilanes. The chloropropyl groups may be obtained by reacting appropriate silanes having SiH bonds with allyl chloride in a generally known manner.

As already indicated in the description of the prior art, it has previously been proposed to us e chloropropyl group containing polysiloxanes in the preparation of the cold hardening, highly elastic polyurethane foams (see U. S. Pat. No. 4,042,540). This patent, however, requires that the organopolysiloxanes are not permitted to contain units or moieties whose Si number exceeds 12. The patent thus is concerned with siloxane mixtures which are no longer equilibrated, since the higher molecular moieties (n>10) have been removed from the equilibrium. Accordingly, it was surprising that in the technique of what has been referred to above as the "second method of operation or procedure", the siloxane mixtures obtained can be successfully used directly and without expensive and cumbersome separation of the higher molecular components or moieties. This is even more surprising since the results are excellent.

Compared to foams prepared which correspond to the state of the art according to European Patent No. 0 000 761, the polyurethane foams obtained by the inventive method have a somewhat coarser cell structure, therefore, a higher elasticity. The degree to which the foamed material is open celled, as measured by the impression force, is greater for the foams produced pursuant to the invention. It turns out that those polysiloxanes which are to be used for the method of the invention and have lateral chloropropyl entities, that is, chloropropyl entities distributed in the chain, have a better balance between stabilizing and cell-opening properties.

In the following examples, the superior properties of the organifunctional polysiloxanes used in the method of the invention as stabilizers in conventional foam formulations of the art is demonstrated, it being understood that these examples are given by way of illustration and not by way of limitation.

1. Molded Foam

Experimental Foaming Procedure

With the exception of the polyisocyanate, the components listed in Formulations 1 to 3 are weighed into a 2 L beaker and strirred for 60 seconds at 500 RPM with a propellor stirrer. The appropriate amounts of polyisocyanate are added subsequently and the mixture is stirred for a further 7 seconds at 2.000 RPM. The reaction mixture is added to a 40×40×10 cm aluminum mold, which has been preheated to 45° C. and pretreated with a release agent. The mold setting time for the formulations 1 to 3 cited is 8 minutes.

Evaluation of the Molded Foams

To determine the impression force, the foamed part is carefully removed from the mold. Immediately afterwards, the indentation hardness at 50% compression is measured at the foamed part on which no pressure has been exerted. The round stamp used for this purpose has an area of 300 cm$^2$. After the pressure has been released, the closed cells present in the foamed part, are opened by extensive fulling. After that, the indentation hardness at 50% compression is measured once more. The difference between the two values in N is taken to be a measure of the impression force.

In addition, the number of cells per cm and the uniformity of the cell structure are evaluated.

The polysiloxane copolymers, which are to be used pursuant to the invention, were tested with the following formulations for highly elastic polyurethane molded foams.

| Formulation 1 (Molded Foam) | |
|---|---|
| Polyol 1 | 60 |
| Polyol 2 | 40 |
| Water (total) | 4.3 |
| Diethanolamine | 1.5 |
| TEGOAMIN ® 33[1] | 0.5 |
| TEGOAMIN ® BDE[2] | 0.07 |
| KOSMOS ® 21[3] | 0.05 |
| Foam stabilizer | variable |
| TDI 80/20 | 44.7 |
| Index | 87 |
| Formulation 2 (Molded Foam) | |
| Polyol 1 | 75 |
| Polyol 2 | 25 |
| Water (total) | 3.1 |
| Diethanolamine | 0.7 |
| TEGOAMIN ® 33[1] | 0.4 |
| TEGOAMIN ® BDE[2] | 0.12 |
| KOSMOS ® 19[4] | 0.02 |
| TDI 80/20 | 37.0 |
| Index | 100 |
| Formulation 3 (Molded Foam) | |
| Polyol 1 | 65 |
| Polyol 3 | 35 |
| Water (total) | 3.9 |
| TEGOAMIN ® 33[1] | 0.3 |
| TEGOAMIN ® BDE[2] | 0.08 |
| Niax ® A 107[5] | 0.15 |
| KOSMOS ® 21[3] | 0.02 |

-continued

| Isocyanate mixture of | |
|---|---|
| 22% Crude MDI | 40.3 |
| 78% TDI 80/20 | 84 |

The following mixtures were used as foam stabilizers:
A. 10% by weight of polychloropropy-polysiloxane, dissolved in 90% by weight of a pure poly(propylene oxide) polyether having a molecular weight of 400.
B. 10% by weight of a polychloropropyl-polysiloxane, dissolved in 83% by weight of the polyether of A and 7 % by weight of a polydimethylsiloxane fraction having a chain length of N=5 to 9.

The following polysiloxanes are used to prepare mixtures A and B:
I Stabilizer as described in European Patent 0 000 761
II Inventive formula I with $n=3$, $m=2$, $R^1=CH_3$
III Inventive formula I with $n=3$, $m=1$, $R^1=CH_3$.

The comparison stabilizer I is used in pure form, that is, without being diluted.

EXAMPLE 1

The following results are obtained with Formulation 1 using the stabilizer mixture A with the polychloropropyl-siloxanes II and III, as well as the comparison stabilizer I:

| Stabilizer | % by Weight | Impression Force N | Cells/cm | Elasticity % | Cell Structure | Skin Condition |
|---|---|---|---|---|---|---|
| I | 0.2 | 120 | — | — | deformed | very deformed |
|   | 0.25 | 125 | 10 | 52 | regular | very deformed |
|   | 0.35 | 130 | 11 | 53 | regular | very deformed |
|   | 0.5 | 145 | 12 | 49 | regular | very deformed |
| II | 0.3 | 65 | — | — | deformed | deformed |
|   | 0.5 | 60 | 7 | 57 | regular | slightly deformed |
|   | 0.75 | 60 | 8 | 58 | regular | good |
|   | 1.0 | 63 | 8 | 60 | regular | good |
| III | 0.3 | 60 | — | — | deformed | deformed |
|   | 0.5 | 58 | 8 | 55 | regular | good |
|   | 0.75 | 7 | 8 | 55 | regular | good |
|   | 1.0 | 63 | 9 | 58 | regular | good |

EXAMPLE 2

The following results are obtained with Formulation 1 using the stabilizer mixture B with the polychloropropyl-siloxanes II and III, as well as the comparison stabilizer I:

| Stabilizer | % by Weight | Impression Force N | Cells/cm | Elasticity % | Cell Structure | Skin Condition |
|---|---|---|---|---|---|---|
| I | 0.2 | 120 | — | — | deformed | very deformed |
|   | 0.25 | 125 | 10 | 52 | regular | very deformed |
|   | 0.35 | 130 | 11 | 53 | regular | very deformed |
|   | 0.5 | 145 | 12 | 49 | regular | very deformed |
| II | 0.3 | 80 | 8 | — | regular | deformed |
|   | 0.5 | 70 | 9 | 53 | regular | slightly deformed |
|   | 0.75 | 70 | 10 | 55 | regular | good |
|   | 1.0 | 65 | 10 | 56 | regular | good |
| III | 0.3 | 75 | 9 | 54 | regular | slightly deformed |
|   | 0.5 | 74 | 9 | 53 | regular | good |
|   | 0.75 | 70 | 10 | 53 | regular | good |
|   | 1.0 | 65 | 10 | 54 | regular | good |

EXAMPLE 3

The following results are obtained with Formulation 2 using the stabilizer mixture A with the polychloropropyl-siloxanes II and III, as well as the comparison stabilizer I:

| Stabilizer | % by Weight | Impression Force N | Cells/cm | Elasticity % | Cell Structure | Skin Condition |
|---|---|---|---|---|---|---|
| I | 0.3 | 140 | — | — | deformed | deformed |
|   | 0.5 | 140 | 10 | 54 | regular | deformed |
|   | 0.75 | 155 | 12 | 55 | regular | deformed |
|   | 1.0 | 170 | 15 | 52 | regular | deformed |
| II | 0.5 | 110 | — | — | deformed | — |
|   | 1.0 | 105 | — | — | deformed | — |
|   | 1.5 | 102 | 8 | 59 | regular | deformed |
|   | 2.0 | 90 | 9 | 58 | regular | deformed |
| III | 0.5 | 120 | — | — | deformed | — |
|   | 1.0 | 110 | 8 | 57 | regular | deformed |
|   | 1.5 | 105 | 9 | 59 | regular | good |
|   | 2.0 | 90 | 9 | 61 | regular | good |

EXAMPLE 4

The following results are obtained with Formulation 2 using the stabilizer mixture B with the polychloropropyl-siloxanes II and III, as well as the comparison stabilizer I:

| Stabilizer | % by Weight | Impression Force N | Cells/cm | Elasticity % | Cell Structure | Skin Condition |
|---|---|---|---|---|---|---|
| I | 0.3 | 140 | — | — | deformed | deformed |
|   | 0.5 | 140 | 10 | 54 | regular | deformed |
|   | 0.75 | 155 | 12 | 55 | regular | deformed |
|   | 1.0 | 170 | 15 | 52 | regular | deformed |
| II | 0.5 | 90 | — | — | deformed | deformed |
|   | 1.0 | 75 | 9 | 56 | regular | deformed |
|   | 1.5 | 80 | 9 | 55 | regular | deformed |
|   | 2.0 | 110 | 11 | 55 | regular | deformed |
| III | 0.5 | 85 | — | — | deformed | deformed |
|   | 1.0 | 90 | 9 | 56 | regular | good |
|   | 1.5 | 90 | 10 | 56 | regular | good |
|   | 2.0 | 90 | 12 | 54 | regular | good |

EXAMPLE 5

The following results are obtained with Formulation 3 using the stabilizer mixture A with the polychloropropyl-siloxanes II and III, as well as the comparison stabilizer I:

| Stabilizer | % by Weight | Impression Force N | Cells/cm | Elasticity % | Cell Structure | Skin Condition |
|---|---|---|---|---|---|---|
| I | 0.3 | 130 | 10 | 49 | regular | deformed |
|   | 0.5 | 100 | 11 | 52 | regular | good |
|   | 0.75 | 110 | 12 | 51 | regular | good |
|   | 1.0 | 130 | 14 | 48 | regular | good |

-continued

| Stabilizer | % by Weight | Impression Force N | Cells/cm | Elasticity % | Cell Structure | Skin Condition |
|---|---|---|---|---|---|---|
| II | 0.5 | 120 | — | — | deformed | deformed |
|  | 0.75 | 110 | 8 | 52 | regular | deformed |
|  | 1.0 | 110 | 9 | 54 | regular | good |
|  | 1.5 | 100 | 9 | 52 | regular | good |
| III | 0.5 | 130 | — | — | deformed | deformed |
|  | 0.75 | 105 | 8 | 50 | regular | good |
|  | 1.0 | 100 | 9 | 50 | regular | good |
|  | 1.5 | 105 | 9 | 53 | regular | good |

EXAMPLE 6

The following results are obtained with Formulation 3 using the stabilizer mixture B with the polychloropropyl-siloxanes II and III, as well as the comparison stabilizer I:

| Stabilizer | % by Weight | Impression Force N | Cells/cm | Elasticity % | Cell Structure | Skin Condition |
|---|---|---|---|---|---|---|
| I | 0.3 | 130 | 10 | 49 | regular | deformed |
|  | 0.5 | 100 | 11 | 52 | regular | good |
|  | 0.75 | 110 | 12 | 51 | regular | good |
|  | 1.0 | 130 | 14 | 48 | regular | good |
| II | 0.5 | 70 | 9 | 56 | regular | good |
|  | 0.75 | 75 | 10 | 55 | regular | good |
|  | 1.0 | 80 | 10 | 55 | regular | good |
|  | 1.5 | 90 | 11 | 55 | regular | good |
| III | 0.5 | 75 | 9 | 52 | regular | good |
|  | 0.75 | 75 | 10 | 53 | regular | good |
|  | 1.0 | 80 | 10 | 54 | regular | good |
|  | 1.5 | 85 | 12 | 52 | regular | good |

2. Block Foam

Procedure

The experiments are carried out using a 2-component Admiral low pressure machine. The polyol output is 10 kg/min. The foaming process takes place in an open box with the dimensions of 100×60×60 cm.

Evaluation of the Block Foams

To evaluate the effect of different foam stabilizers at different concentrations, the foam opening in the block foams, made visible by the blow off, is evaluated qualitatively. The impression force, the porosity of the foams and their elasticity after the impression are measured. In addition, the number of cells per cm and the uniformity of the cell structure are also evaluated for the block foams. The measurements are made as follows:

Evaluating the Blow Off

A differentiation is made between no, a light and a good blow off. The blow off is referred to as good if the convex skin over the whole width of the foam opens up uniformly at the end of the rise reaction.

Measurement of Elasticity

The ASTM D 1564 Ball-Rebound Test is used.

Measurement of Porosity

The indicated values give the back pressure, in mm of water, which is required to maintain a constant air current of 6 L/min through a 10 cm thick piece of foam with sides 30×30 cm. Lower measurement values thus show that the foam is more open celled.

Measurement of Impression Force

To carry out this measurement, the foaming is conducted in an open box with the dimensions of 25×25×25 cm. After a 2-day storage under normal atmospheric conditions, the peak is cut off at a height of 20 cm. The indentation hardness is measured at the untouched as well as at the well fulled foam. The difference between the forces determined in N is the force required to impress the cells. A square stamp with an area of 100 cm$^2$ is used to measure the indentation forces.

The values of the impression force, the porosity and the elasticity are closely related and represent a measure of the open-celled nature of the foam after its manufacture. Since the residues of cell windows, remaining after the impressions, impede the passage of air, originally closed foams show inferior porosity and elasticity values even after the impression.

The polysiloxane copolymers, which are to be used pursuant to the invention, are furthermore checked with the following formulations for highly elastic polyurethane block foams:

| Formulation 4 (Block Foam) | |
|---|---|
| Polyol 4 | 100 |
| Water (total) | 3.2 |
| Diethanolamine | 1.3 |
| TEGOAMIN ® BDE | 0.1 |
| TEGOAMIN ® 33 | 0.2 |
| KOSMOS ® 29 | 0.2 |
| Foam stabilizer 80 | variable |
| T 80 | 43.3 |
| Index | 110 |

EXAMPLES 7

The following results are obtained with Formulation 4 using the stabilizer mixture B with the polychloropropyl-siloxanes II and III, as well as the comparison stabilizer I:

| Stabilizer | Parts by Weight | Rise Time | Blow Off | Impression N | Elasticity | Porosity | Cells/cm |
|---|---|---|---|---|---|---|---|
| I | 0.2 | 118 | none | 170 | 55 | 38 | 8 |
|  | 0.6 | 114 | none | 150 | 57 | 32 | 10 |
|  | 1.2 | 108 | slight | 130 | 57 | 19 | 10 |
| III | 0.2 | 125 | none | 140 | 56 | 28 | 8 |
|  | 0.6 | 108 | slight | 90 | 58 | 20 | 9 |
|  | 1.2 | 106 | strong | 80 | 59 | 11 | 9 |

Explanation of the raw material descriptions used in Formulations 1 to 4:

Polyol 1 Voranol$^{(R)}$ CP 4711, Dow Chemical, OH number of 35. 18% ethylene oxide, 80% primary OH Polyol 2 Desmophen$^{(R)}$ 7617, Bayer AG OH number of 28, 20% solids (PHD)

Polyol 3 Niax$^{(R)}$ 34-28, Union Carbide. OH number of 28, 20% solids (acrylonitrile-styrene copolymer)

Polyol 4 Niax$^{(R)}$ CM 11, Union Carbide, OH number of 32, 10% solids (acrylonitrile-styrene copolymer)

TEGOAMIN$^{(R)}$ 33[1]) 33% solution of triethylenediamine in dipropylene glycol, Th. Goldschmidt AG TEGOAMIN$^{(R)}$ BDE[2]) 70% solution of bis(dimethylaminoethyl)-ether in dipropylene glycol, Th. Goldschmidt AG KOSMOS(R) 213)Dibutyl tin (IV) dimercaptide type, Th. Goldschmidt AG KOSMOS(R) 194) Dibutyl tin(IV) dilaurate type, Th. Goldschmidt AG Niax(R) A 1075) 70% solution of bis-(dimethylaminoethyl)-ether formiate in dipropylene glycol Examples 1 to 6 confirm that, with the polychloropropyl-polysiloxanes, which are to be used pursuant to the invention.
  a) a stabilization of the foams is possible with stabilizer concentrations, which are clearly lower than those of the comparison stabilizer.
  b) the open-celled nature of the foams prepared (impression force) is significantly better than that of foams prepared with the chloromethyl-modified Product I
  c) the nature of the skin, especially that of foam pillows prepared on the basis of organic filler-containing polyols and in relatively cold molds (45° C. is distinctly better than that of the Comparison Product I Example 7 confirms that, in addition to the Examples 1 to 6, the polychloropropyl-polysiloxanes described maybe used for the stabilization of highly elastic polyurethane block foams.

What is claimed is:

1. In a method for the preparation of highly elastic, cold curing polyurethane foams, wherein the foaming is performed with predominantly difunctional polyisocyanates and at least difunctional polyols, catalysts, water or other blowing agents or mixtures thereof, in the presence of an organofunctional polysiloxane as stabilizer, the improvement which comprises carrying out the preparation of the polyurethane foam in the presence of an organofunctional polysiloxane which is equilibrated and has the average general formula

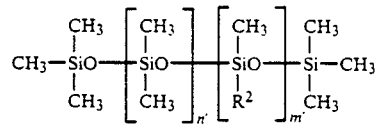

wherein
  $R^2$ is chloropropyl,
  $n'$ has a value of 1 to 10, and
  $m'$ has a value of 1 to 6.0.

2. The improvement of claim 1, wherein the foaming mixture contains 0.01 to 2.0% by weight of said polysiloxane based on the polyols in the mixture.

3. In the method as claimed in claim 1, wherein the polyisocyanate is an isomer of toluene diisocyanate, an isomer of diisocyanatodiphenlmethane or oligomeric polyphenylmethylene isocyanate while the at least difunctional polyols have 2–8 hydroxyl groups per molecule of which, on the average, 70 to 90% are primary hydroxyl groups.

4. In the method of claim 3, wherein the polyols consist of oxyethylene and oxypropylene units.

5. In the method of claim 3, wherein the polyols comprise a major portion of oxyethylene and oxypropylene units with up to 30% by weight of polymers of styrene or acrylonitrile or derivates of polyurea.

* * * * *